United States Patent
Tan et al.

(10) Patent No.: US 10,697,505 B2
(45) Date of Patent: Jun. 30, 2020

(54) CLUTCH CONTROL

(71) Applicant: Microsoft Technology Licensing, LLC, Redmond, WA (US)

(72) Inventors: Jui Tong Tan, Bellevue, WA (US); Junzhuo Tian, Bellevue, WA (US); David Xing, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 652 days.

(21) Appl. No.: 15/170,823

(22) Filed: Jun. 1, 2016

(65) Prior Publication Data
US 2017/0351296 A1 Dec. 7, 2017

(51) Int. Cl.
| | |
|---|---|
| *F16D 63/00* | (2006.01) |
| *F16D 55/16* | (2006.01) |
| *G06F 1/16* | (2006.01) |
| *F16D 121/24* | (2012.01) |
| *F16D 66/00* | (2006.01) |

(52) U.S. Cl.
CPC .......... *F16D 63/006* (2013.01); *F16D 55/16* (2013.01); *G06F 1/1601* (2013.01); *G06F 1/1615* (2013.01); *G06F 1/1679* (2013.01); *G06F 1/1681* (2013.01); *F16D 2066/003* (2013.01); *F16D 2121/24* (2013.01)

(58) Field of Classification Search
CPC .... F16D 2121/24; F16D 63/006; F16D 15/00; F16D 23/00; G06F 1/1616; H05K 5/0017
See application file for complete search history.

(56) References Cited

U.S. PATENT DOCUMENTS

| | | | |
|---|---|---|---|
| 6,295,883 B1 | 10/2001 | Tsukada et al. | |
| 6,473,046 B1 * | 10/2002 | Dickie | H01Q 1/22 |
| | | | 343/702 |
| 7,002,311 B2 | 2/2006 | Strike et al. | |
| 7,914,055 B2 | 3/2011 | Yoshinaka | |
| 2001/0042990 A1 | 11/2001 | Ito et al. | |
| 2006/0146488 A1 | 7/2006 | Kimmel | |
| 2007/0103855 A1 | 5/2007 | Hara et al. | |
| 2010/0282798 A1 | 11/2010 | Park | |
| 2010/0318224 A1 * | 12/2010 | Okuda | B25J 9/1676 |
| | | | 700/255 |
| 2012/0001844 A1 | 1/2012 | Auguste et al. | |
| 2014/0002272 A1 | 1/2014 | Braun | |
| 2016/0041582 A1 * | 2/2016 | Kim | G06F 1/1605 |
| | | | 361/679.22 |

OTHER PUBLICATIONS

TI Designs, "Laptop/Notebook Computer Fan Controller", retrieved at <<http://www.ti.com/lit/ug/tidua42/tidua42.pdf>>, Jul. 2015, 20 pages.

* cited by examiner

*Primary Examiner* — Xanthia C Cunningham
(74) *Attorney, Agent, or Firm* — Rainier Patents, P.S.

(57) ABSTRACT

The description relates to devices that include hinged portions and controlling rotation of the hinged portions with smart clutch control. One example can include powering a motor to cause clutch portions to engage in a first instance. The example can also include monitoring an operational parameter during the powering. The method can further include, based at least in part upon the monitoring, adjusting power to cause the clutch portions to engage in a second instance with a force that is different than the first instance.

32 Claims, 12 Drawing Sheets

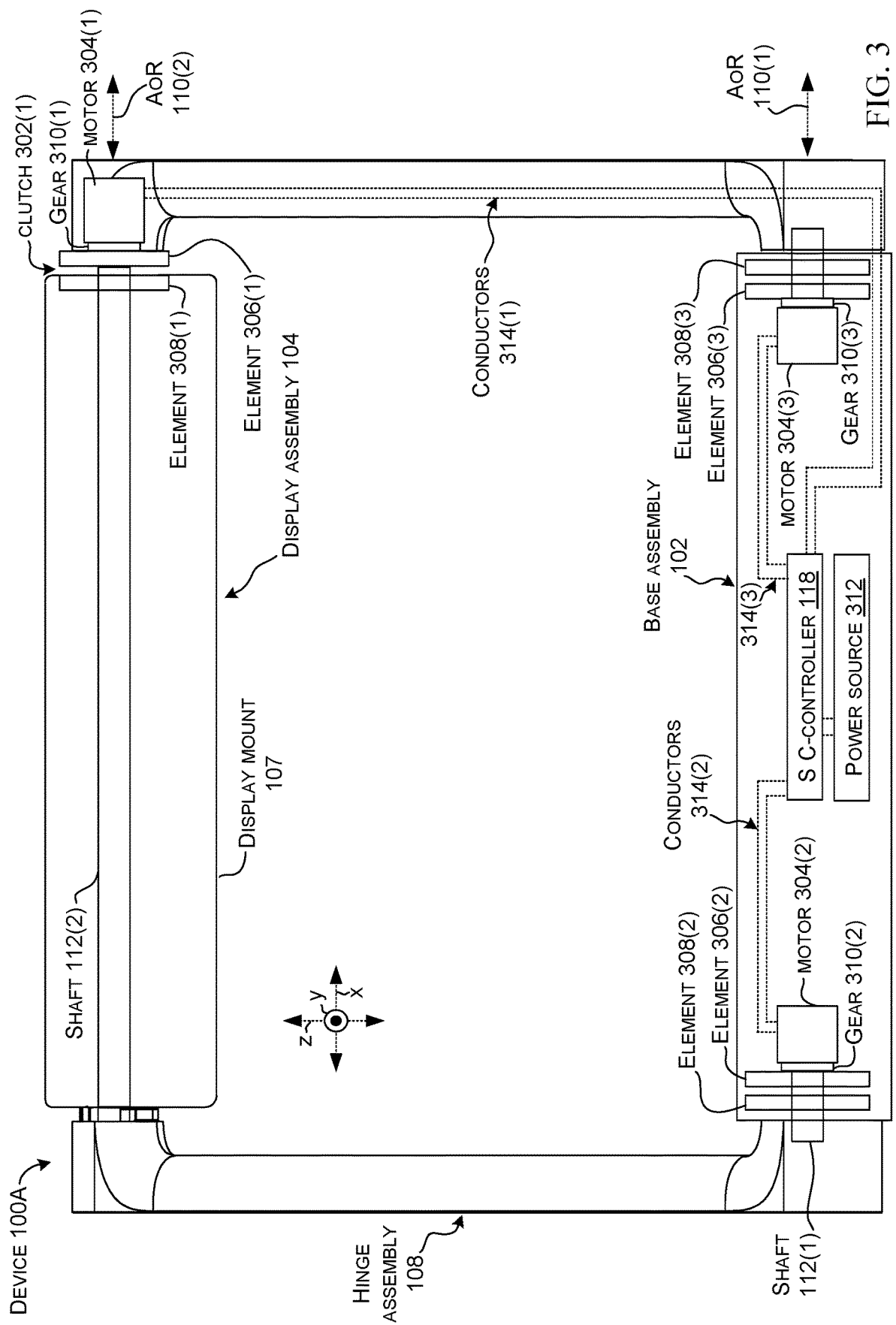

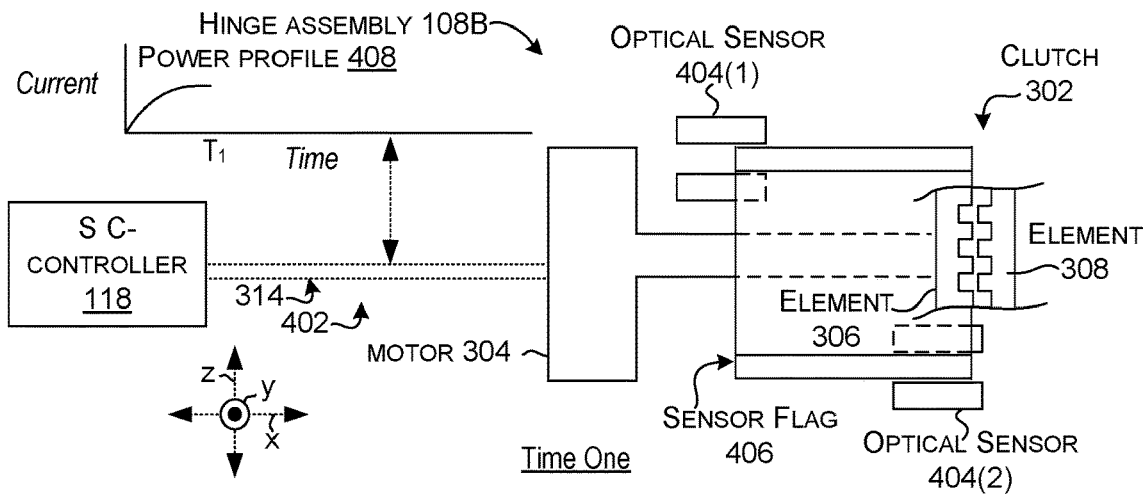
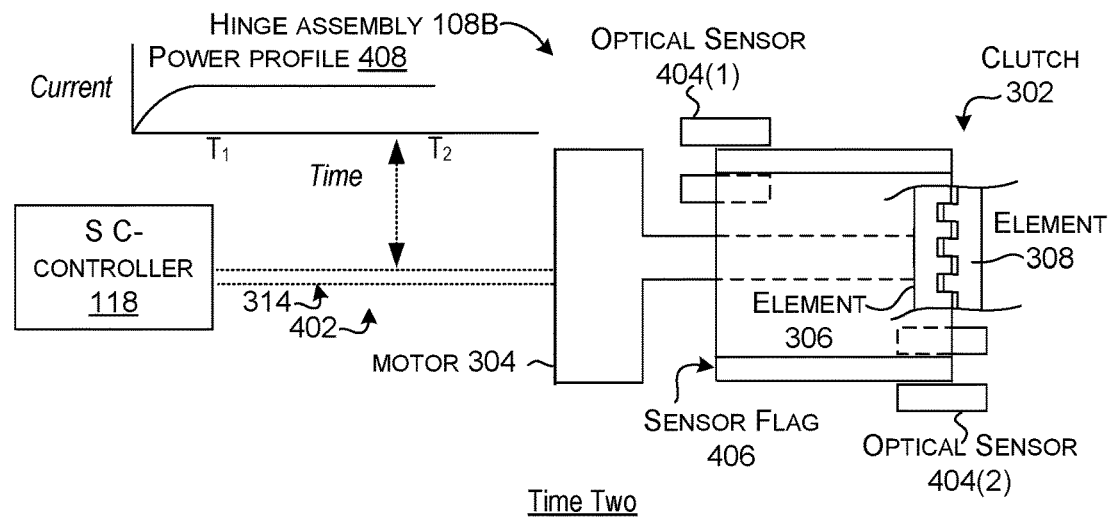
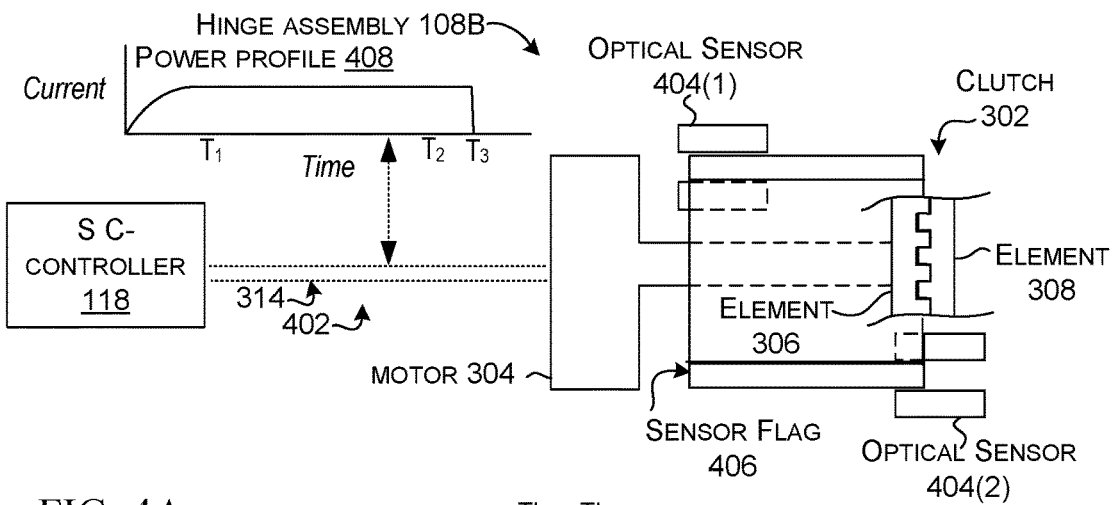
FIG. 4A

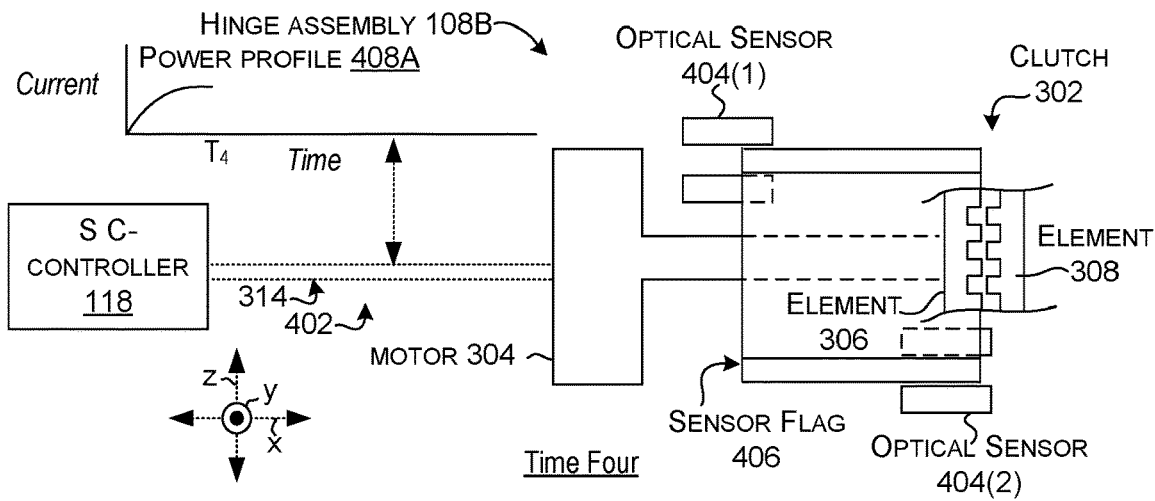
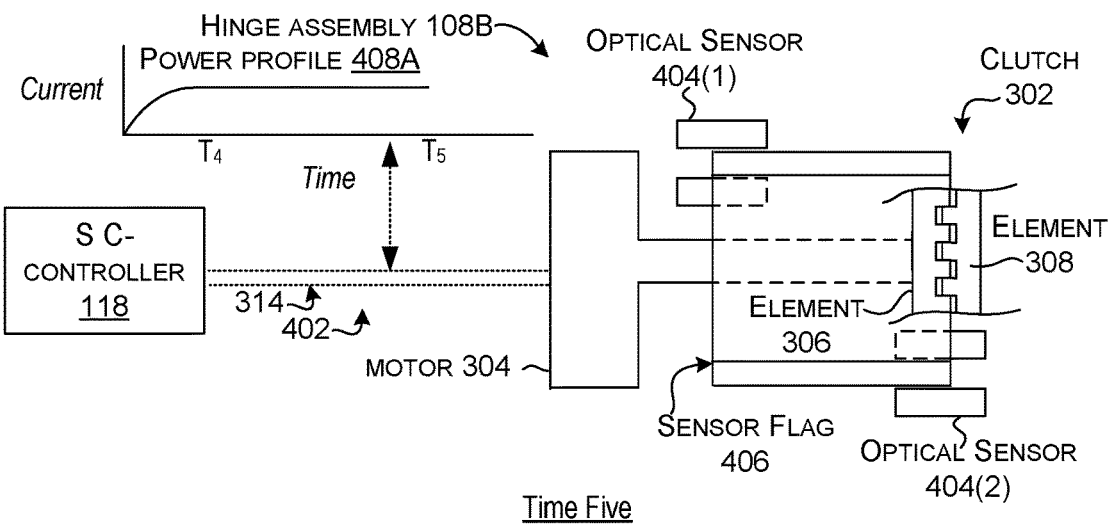
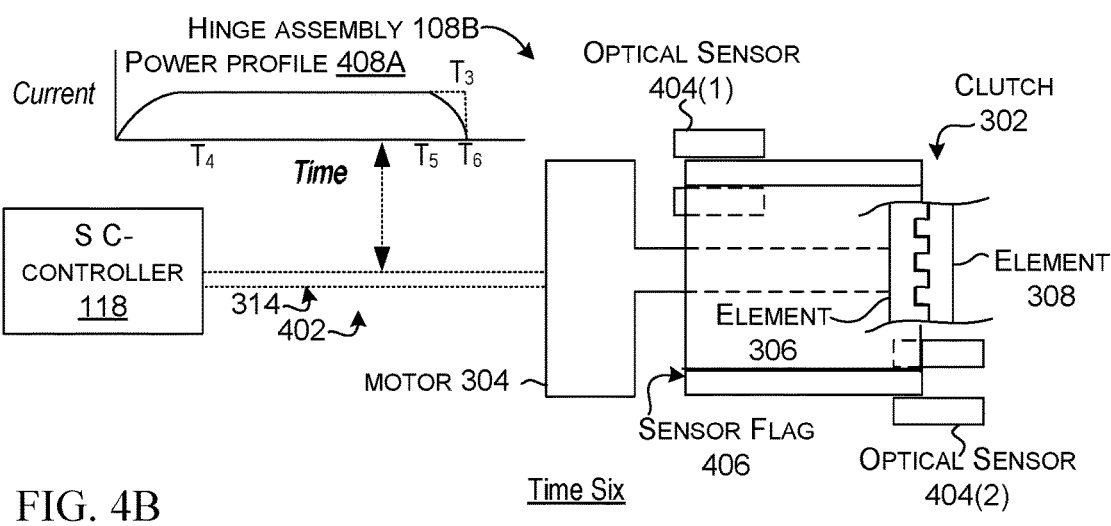
FIG. 4B

CLUTCH CONTROL

BACKGROUND

The description relates to devices and specifically to hinged devices that employ a clutch to lock and unlock the hinge and techniques for controlling the clutch.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 1A-1B, 2A-2D, and 3 are elevational views of an example device in accordance with the present concepts.

FIGS. 4A and 4B are sectional views of portions of example devices in accordance with the present concepts.

DESCRIPTION

Overview

Figure 1A:
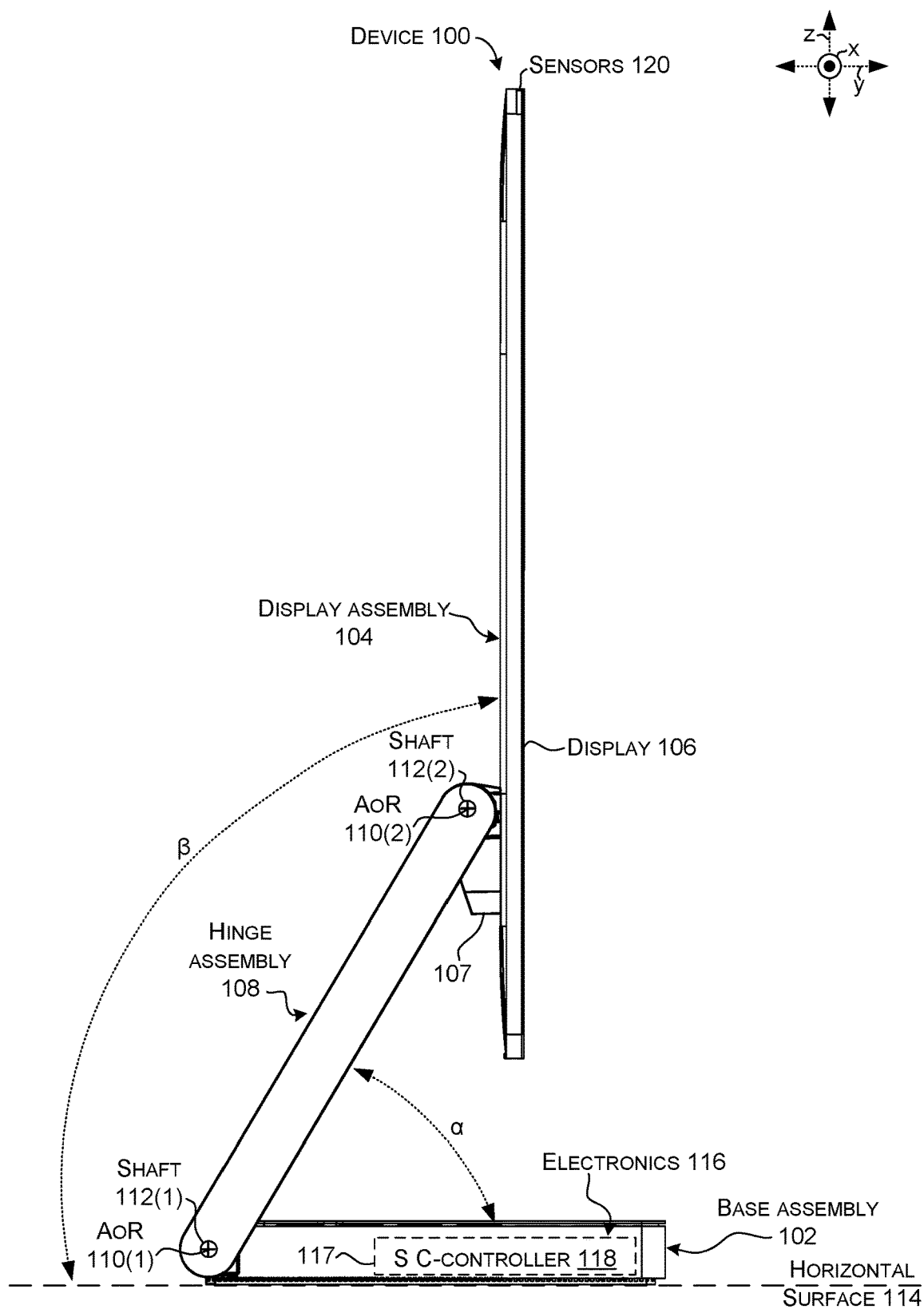

The present concepts relate to devices, such as computing devices that can include first and second hinged device portions that can be rotated relative to one another. A hinge can rotatably couple the first and second device portions around an axis. A clutch can be positioned relative to the axis and can include opposing first and second clutch elements. A motor can be configured to cause the opposing clutch elements to engage one another to prevent rotation around the axis (e.g., lock) and to disengage the opposing clutch elements to allow rotation around the axis.

A controller can be configured to drive the motor to cause the opposing first and second clutch elements to engage/disengage one another to lock/unlock the first and second portions. Traditionally, position sensors are employed to provide information used by the controller to attempt to move the clutch elements relative to one another. However, device tolerances can cause the first and second clutch elements to contact one another too fast and/or too hard thereby causing the device portions to stop suddenly despite the presence of the position sensors. This sudden stop can produce undesired noise, can cause the device to jerk or lurch, and/or can cause excessive stress and/or wear on device components.

The inventive concepts can utilize feedback from driving the motor to adjust or tune subsequent operation to achieve less damaging engagement of the clutch elements (e.g., in accordance with defined operational parameter(s) such as a rate at which the clutch elements contact one another). This tuning can be performed iteratively (on successive clutch cycles) until the first and second clutch elements engage in an appropriate or desired manner (e.g., not too fast and not too slow as defined by the operational parameters). Further, this iterative process can adjust the motor control to compensate for device wear over the device lifecycle. For example, the defined operational parameters can be satisfied even as components wear and overall device dimensions change (e.g., compensate for slop or play as components wear).

This process can be viewed as 'smart clutch control' and in some implementations this smart clutch control can be performed by a 'smart clutch-controller.' From one perspective, smart clutch control can be viewed as a learning process in that subsequent clutch cycles can be controlled based upon feedback of how the clutch is actually operating.

Stated another way, the 'smart clutch-controller' can learn how to drive the motor by sensing the present operation of the motor. For instance, the controller can drive the motor a first time. The controller can sense an operational parameter as the first and second clutch elements engage one another the first time. The controller can then adjust driving the motor based at least in part upon the sensed motor-related parameter to cause the first and second clutch elements to engage one another a second time in a manner that is closer to defined specifications (e.g., the operational parameters), such that the clutch elements contact one another at a defined rate.

Introductory FIGS. 1A-1B and 2A-2D show example devices which can implement smart clutch control.

Figure 1B:
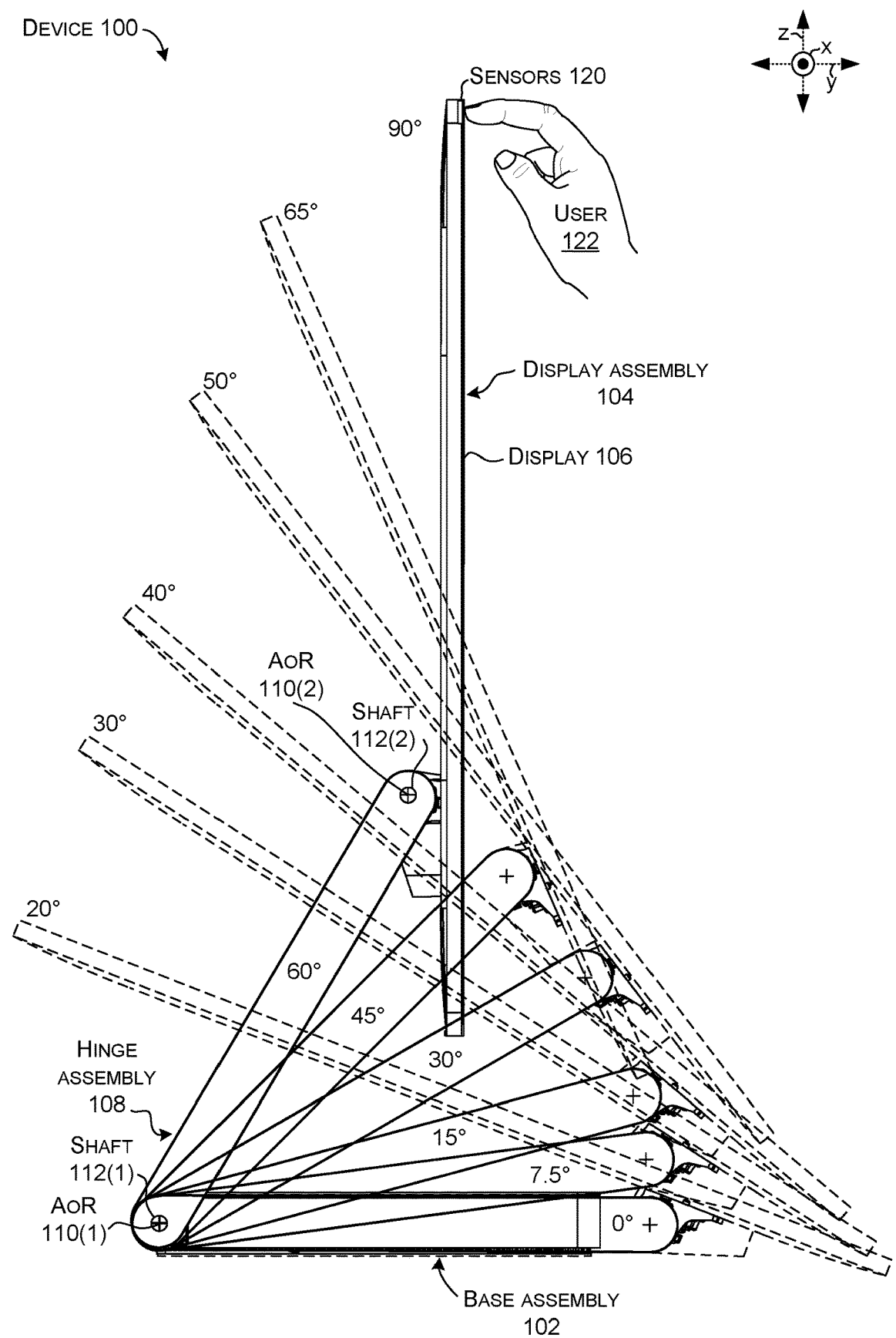
Figure 2A:
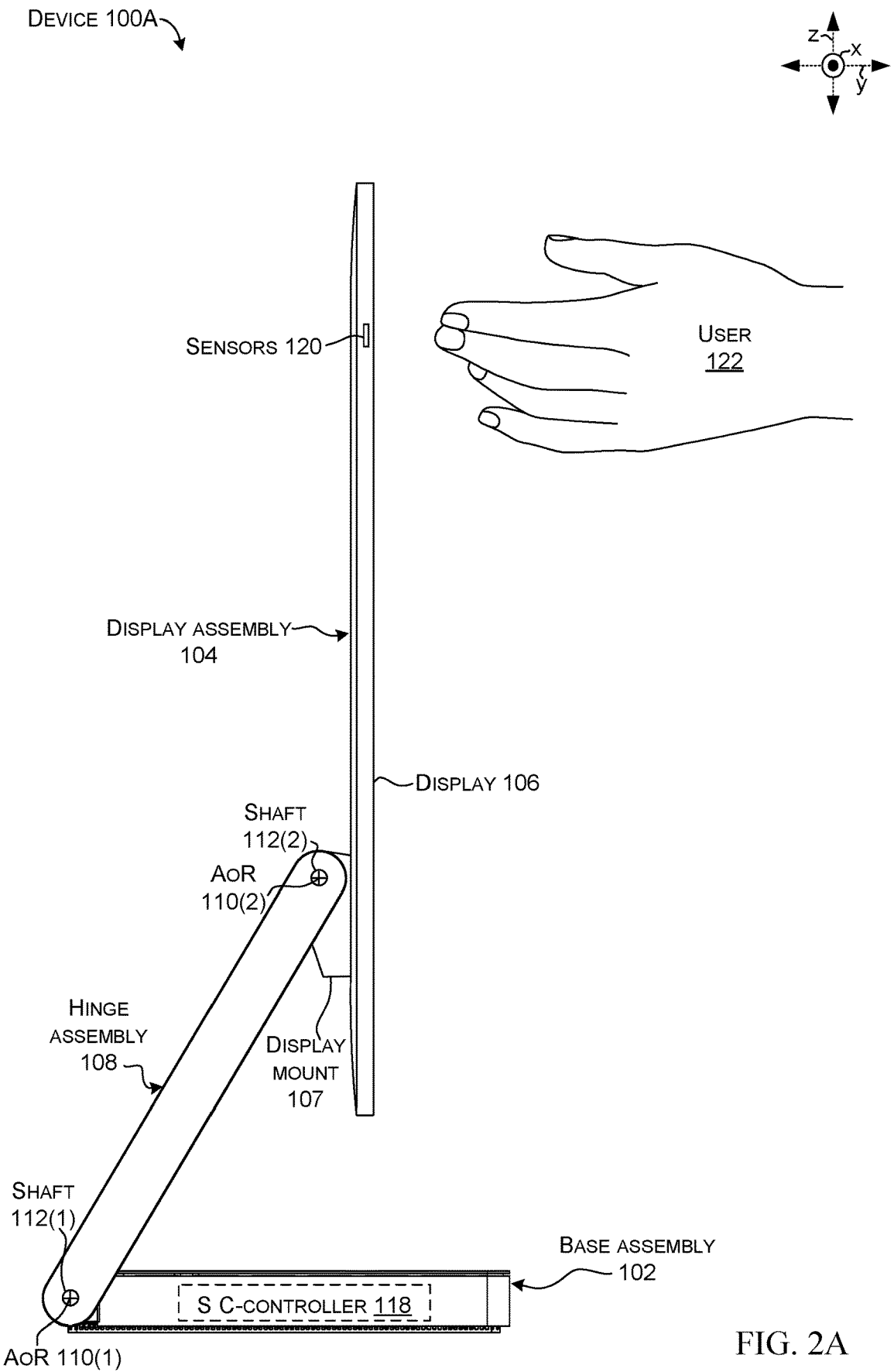
Figure 2B:
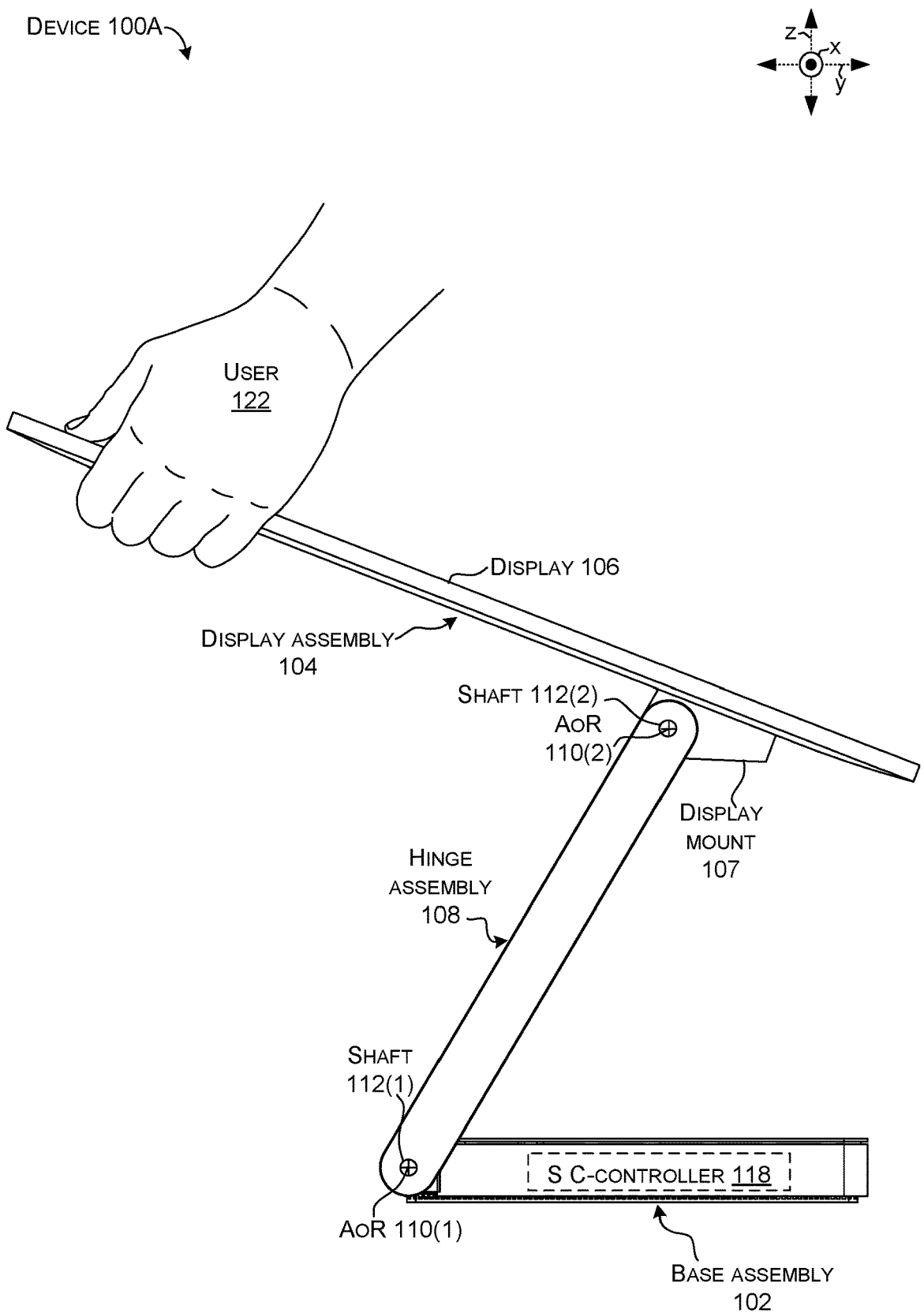
Figure 2C:
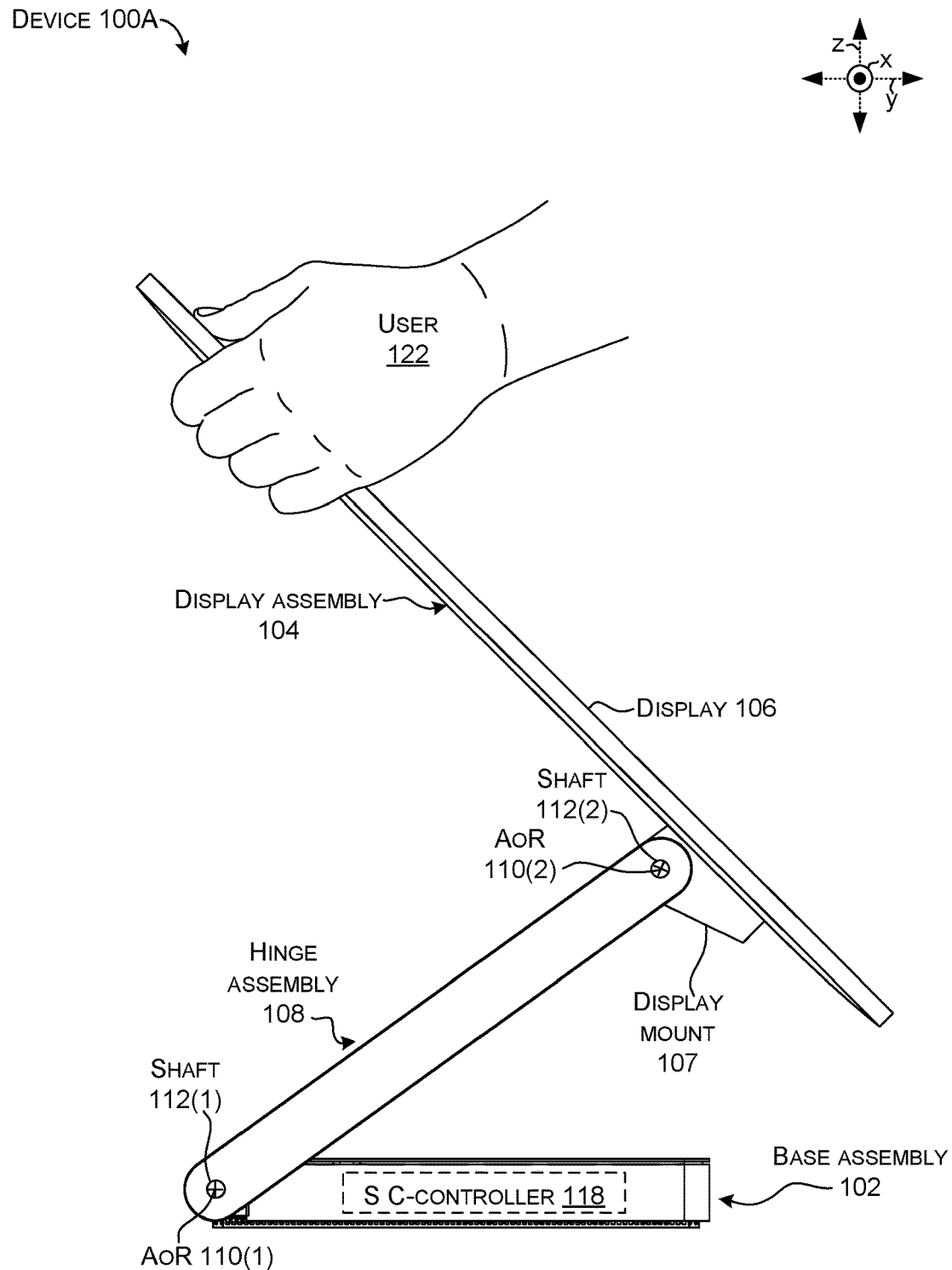
Figure 2D:
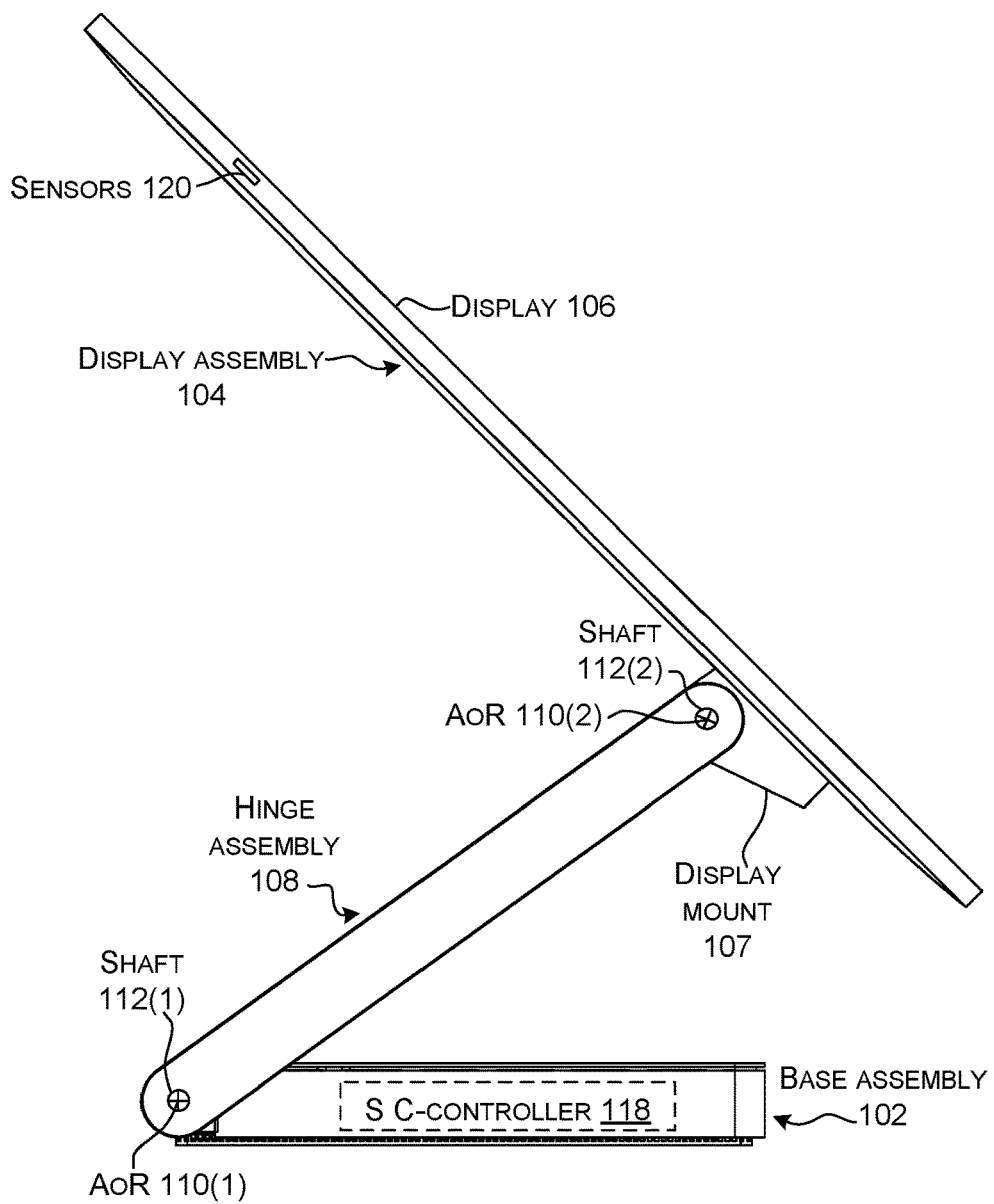

FIGS. 1A and 1B collectively show device 100 that can include a first portion in the form of a base assembly 102 and a second portion in the form of a display assembly 104 that can include a display 106 secured to a display mount 107. A hinge assembly 108 can rotatably couple the first and second portions around an axis of rotation (e.g., "axis") 110 defined by a shaft 112 (e.g., the axis is coextensive with the shaft). In this case, the hinge assembly includes two axes of rotation 110(1) and 110(2) associated with shafts 112(1) and 112(2). Other hinge assembly implementations may include a single axis of rotation. Still other hinge assembly implementations may include three or more axes of rotation.

In the illustrated implementation, rotation around the first axis of rotation 110(1) can define an angle alpha or 'α' between the hinge assembly 108 and the base assembly 102 (e.g., between the hinge arm and a horizontal surface 114 upon which the device is positioned). Rotation around hinge axes 110(1) and 110(2) can define an angle beta or 'β' between the display assembly 104 and the horizontal surface 114. The device can also include various electronics 116, such as a controller 117. The controller 117 can be manifest as a general purpose processor, microcontroller, application specific integrated circuit (ASIC), system on a chip (SoC), etc. From one perspective, in some implementations, the controller 117 can be viewed as a smart clutch-controller 118. The controller 117 can receive signals from a user control sensor 120. The user control sensor 120 can detect that the user wants to reposition the display 106. For instance, the user control sensor can detect that a user 122 is touching a portion of the display assembly 104 (and/or with how much force the user is touching the display assembly), has his/her hand proximate to a portion of the display assembly, and/or is performing a gesture or verbal command associated with a desire to reposition the display.

Specific examples of electronics 116 are described above. Other examples of electronics 116 can include storage, memory, buses, etc. The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or userrelated data, can be stored on storage, such as storage that can be internal or external to the computer. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, controller 117 can be implemented as a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (GPUs), controllers, microcontrollers, processor cores, or other types of processing devices.

Generally, any of the functions described herein, such as smart clutch control can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, "component" may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Some SOC configurations can employ an application specific integrated circuit (ASIC). For example, the ASIC can include logic gates and memory or may be a microprocessor executing instructions to accomplish the functionality associated with the controller.

FIGS. 2A-2D show another example device 100A. (The suffix 'A' is used on device 100A to convey that components of this device may be the same and/or different from those of device 100 of FIGS. 1A-1B. To avoid clutter on the drawing page the 'A' suffix is not carried through to individual components). In this implementation, user control sensor 120 can detect when the user 122 grasps the side of the display 106 (or other part of the display assembly 104). The user control sensor 120 can send a signal to the smart clutch-controller 118. The smart clutch-controller can allow rotation around either or both of the axes of rotation 110(1) and/or 110(2) associated with hinge assembly 108. When the user releases the side of the display, the user control sensor can stop sending the signal and the smart clutch-controller can smoothly lock rotation around the axes of rotation (e.g., lock the relative positions of the base assembly 102, hinge assembly 108, and/or display assembly 104).

FIG. 3 shows another view of device 100A with the display removed from the display mount 107. FIG. 3 introduces clutch 302 that is driven by motor 304. In this case the motor can be a direct current (DC) motor, among others. The clutch 302 can be manifest as first and second clutch elements 306 and 308. This implementation employs three sets of clutches and motors. Other implementations can include a single set of motors and clutches, two sets, or four or more sets.

The first and second clutch elements 306 and 308 can be configured to not slip relative to one another when engaged against each other. For instance, the opposing elements can include high friction surfaces, teeth, gears, etc. to limit slippage between the two clutch elements. The motor 304 can move clutch element 308 toward and away from element 306 parallel to the x-reference axis via a gear 310 or other mechanism. The motor may function by itself of in combination with other components to move the clutch elements 306 and/or 308. For example, a spring (not specifically designated) may be used to bias the clutch elements toward one another (e.g. into the locked configuration). The motor may overcome this bias and move the clutch portions away from each other to allow rotation and then return the clutch portions to the locked configuration which is then maintained by the bias of the spring.

The smart clutch-controller 118 can be coupled to a power source 312. The smart clutch-controller 118 can selectively drive individual motors 304 along conductor pairs 314 to engage and/or disengage individual clutches 302. The smart clutch-controller 118 can control motor 304(1) to allow/lock rotation around shaft 112(2). Alternatively or additionally, the smart clutch-controller can control motors 302(2) and 302(3) to allow/lock rotation around shaft 112(1).

FIGS. 4A-4B collectively show another hinge assembly 108B that can employ smart clutch-controller 118. (The suffix 'B' is used on hinge assembly 108B to convey that components of this hinge assembly may be the same and/or different from those of hinge assembly(s) 108 of FIGS. 1A-1B, 2A-2D, and 3. To avoid clutter on the drawing page the 'B' suffix is not carried through to individual components). The smart clutch-controller 118 can control clutch 302 by selectively powering motor 304 as indicated at 402 on conductors 314. In this case, the smart clutch-controller can receive information about a location of element 306 from clutch sensors, such as optical sensors 404(1) and 404(2) sensing sensor flag 406 on element 306. The smart clutch-controller 118 can also monitor one or more operational parameters relating to the powering 402 to detect information about interaction of clutch element 306 with clutch element 308. In this example, the operational parameters can be current and/or time (e.g., what current is on conductors 314 and for how long), among others. Current and time are graphed to provide an example of a power profile 408, which can also be utilized as another operational parameter. In this case, the power profile is a current profile (e.g., current over time). A slope of the current at different times while the smart clutch-controller is driving the motor can be derived from the current profile. The smart clutch-controller can use the current slope as an indicator of how the clutch elements 306 and 308 engaged one another. Alternatively or additionally, the smart clutch-controller can utilize other operational parameters as indicators of how the clutch elements are engaging. Other examples of operational parameters can include power and/or pulse width modulation, among others. Individual operational parameters can also be user defined. For example, the user may specify whether they want the hinge to operate more 'crisply' or more 'smoothly'. This user defined operational parameter and/or other operational parameters can be considered when the smart clutch-controller adjusts power to the motor in subsequent cycles.

The illustrated examples of FIGS. 4A and 4B start with the clutch in an unlocked configuration where the hinge assembly 108B can rotate freely.

As illustrated in FIG. 4A, at Time One ($T_1$), in this example, gears of element 306 are not engaged with gears of element 308 so relative rotation is possible. However, at this point, the smart controller 118 has started powering motor 304 to move clutch elements 306 and 308 toward one another. This powering is evidenced in power profile 408 of Time One.

At Time Two ($T_2$) the powering indicated generally at 402 has caused the motor 304 to move elements 306 and 308 toward one another. As evidenced on power profile 408, between Time One and Time Two, the current has stayed relatively constant. However, as the gears of elements 306 and 308 engage, rotation of the hinge assembly begins to be locked by the clutch 302.

As illustrated at Time Three, the engagement of clutch elements 306 and 308 can cause a very sudden rotational stop (e.g., deceleration) at the home or locked position. This very sudden rotational stop can be especially pronounced when an individual clutch element 306 or 308 is rotating at a relatively high rate and interacts with the stationary clutch element 306 or 308 resulting in a 'hard stop'. Hard stops can create stress on various device components, such as the motor 304, clutch 302, and/or shaft (112, FIG. 3), among others. The stress can cause premature component failure. The hard stops can also create an audible sound, such as clicking or grinding that can be undesired for some products, because the sound may be distracting to the user. The smart clutch-controller 118 can detect rotational stops imparted by interaction of the clutch elements 306 and 308 by analyzing operational parameters. For instance, as illustrated at Time Three on the power profile 408, the sudden steep drop in the current can be caused by the hard stop of element 306 interacting with element 308.

The position sensors such as optical sensors 404 can provide information about the relative location of clutch element 306 (in one example) along the x reference direction. This location information can be correlated to the specified location of clutch element 308 (e.g., where the design specifications specify clutch element 308 should be). (In another example, clutch element 308 can move while clutch element 306 remains stationary). However, due to manufacturing variances and/or system wear, clutch elements 306 and/or 308 may or may not be at the specified location. For instance, the range of movement of clutch element 306 could be more or less than specified and/or clutch element 306 could be shifted slightly relative to clutch element 308. For instance, the specification could specify that clutch element 306 be positioned 5 millimeters from clutch element 308 in the rotational configuration and travel 5 millimeters when driven by the motor so that clutch element 306 just contacts clutch element 308 in the locked position. When assembled in an individual device, clutch element 306 could actually be located 4.5 millimeters from clutch element 308 so that when driven by the motor, clutch element 306 is forced into clutch element 308 while still rapidly rotating.

Rather than just relative location information, the operational parameters can provide information (e.g., feedback) about the physical interaction of the clutch element 306 and clutch element 308 based upon actual clutch engagement. This is just one example of how the smart clutch-controller 118 can derive information about the mechanical interactions of the clutch elements 306 and 308 by monitoring operational parameters. FIG. 4B illustrates an example of how the smart clutch-controller can apply this information to enhance clutch performance during subsequent operations.

FIG. 4B shows a subsequent set of times T4-T6 on a subsequent power profile 408A that are similar to times T1-T3 of FIG. 4A and involve a similar scenario (e.g., transitioning clutch 302 from a rotational state to a locked state by powering 402 of motor 304). In this case, smart clutch-controller 118 can utilize information from the operational parameters gathered relative to Times One-Three of FIG. 4A to control clutch operation in a more refined, quieter, and/or less stressful manner. Time Four is generally identical to Time One and Time Five is generally identical to Time Two. However, just prior to Time Six (e.g., between Time Five and Time Six) smart clutch-controller 118 can take an action to decrease a force with which element 306 contacts element 308. In this case, starting at Time Five, the smart clutch-controller can begin to gradually decrease the current that is supplied to motor 304. For comparison sake, a portion of power profile 408 around Time Three is shown in dotted lines on the power profile of Time Six. This decrease in current in FIG. 4B compared to FIG. 4A can decrease the rate of rotation of element 306 so that element 306 is rotating relatively slowly (e.g., relative slowly compared to Time Three of FIG. 4A) when contacting element 308. Continuing with the example above where clutch element 306 is mounted 0.5 mm from the specified location, this adjustment can allow the smart clutch controller 118 to operate motor 304 in subsequent cycles so that the clutch elements engage at specified rotational speeds rather than repeatedly hard stopping.

The above described adjustment of the current profile is only an example of actions that can be taken by the smart clutch-controller 118 to adjust how clutch elements 306 and 308 contact one another. For instance, the smart clutch-controller could change a pulse width modulation of the power supplied to the motor 304 as element 306 approaches element 308 to decrease rotational speed of clutch element 306. This process can be repeated iteratively. For instance, the smart clutch-controller can monitor the current slope of the power profile. Current slope at clutch engagement (e.g., lock-up) can be stored. The stored current slope can be used as feedback to adjust the pulse width modulation of the power delivered by the smart clutch-controller to the motor in subsequent cycles. Then the current slope can be monitored and stored and used to as feedback to adjust the pulse width modulation of subsequent clutch cycles.

As mentioned above, traditionally clutch or position sensors, such as optical sensors 404 have been employed to determine the relative location of the clutch element 306 and/or 308. Design specifications for a given device model can specify the location of clutch element 308 and the location of clutch element 306 at the locked position of Time Three and the rotatable position of Time One, however, manufacturing tolerances dictate that for an individual device, element 308 may not engage exactly in the lock position and in fact may engage slightly before or after the lock position. Thus, these position sensors cannot provide information about the interaction of element 306 with element 308. Utilizing feedback from the operational parameters, such as the illustrated power profile 408, can allow feedback from an individual device to be utilized to adjust subsequent operation of the device to achieve desired operation. Further, the feedback can address manufacturing tolerances since the feedback relates to how the individual device is actually operating rather than just how it was specified to operate. Further, the feedback can allow the device to reduce and/or eliminate variation in how an individual device functions over its lifespan because component wear can be addressed to maintain nearly the same lockup despite increasing component wear. Stated another way, the present smart clutch control can eliminate most or all device-to-device variation for a given device model and ensure that each device functions as specified. Alternatively or additionally, the smart clutch control can eliminate most or all performance change over the lifetime of the device as components wear.

Note further, that in this implementation, smart clutch control can be achieved with existing components. In this case, the smart clutch controller 118 can detect how the clutch 302 is operating by monitoring conductors 314 (e.g., the same conductors that the smart clutch-controller is using to supply power to the motor to actuate the clutch). Thus, at least some implementations can achieve the additional functionality of smart clutch control without adding additional components, such as additional conductors, sensors, etc.

Figure 5:
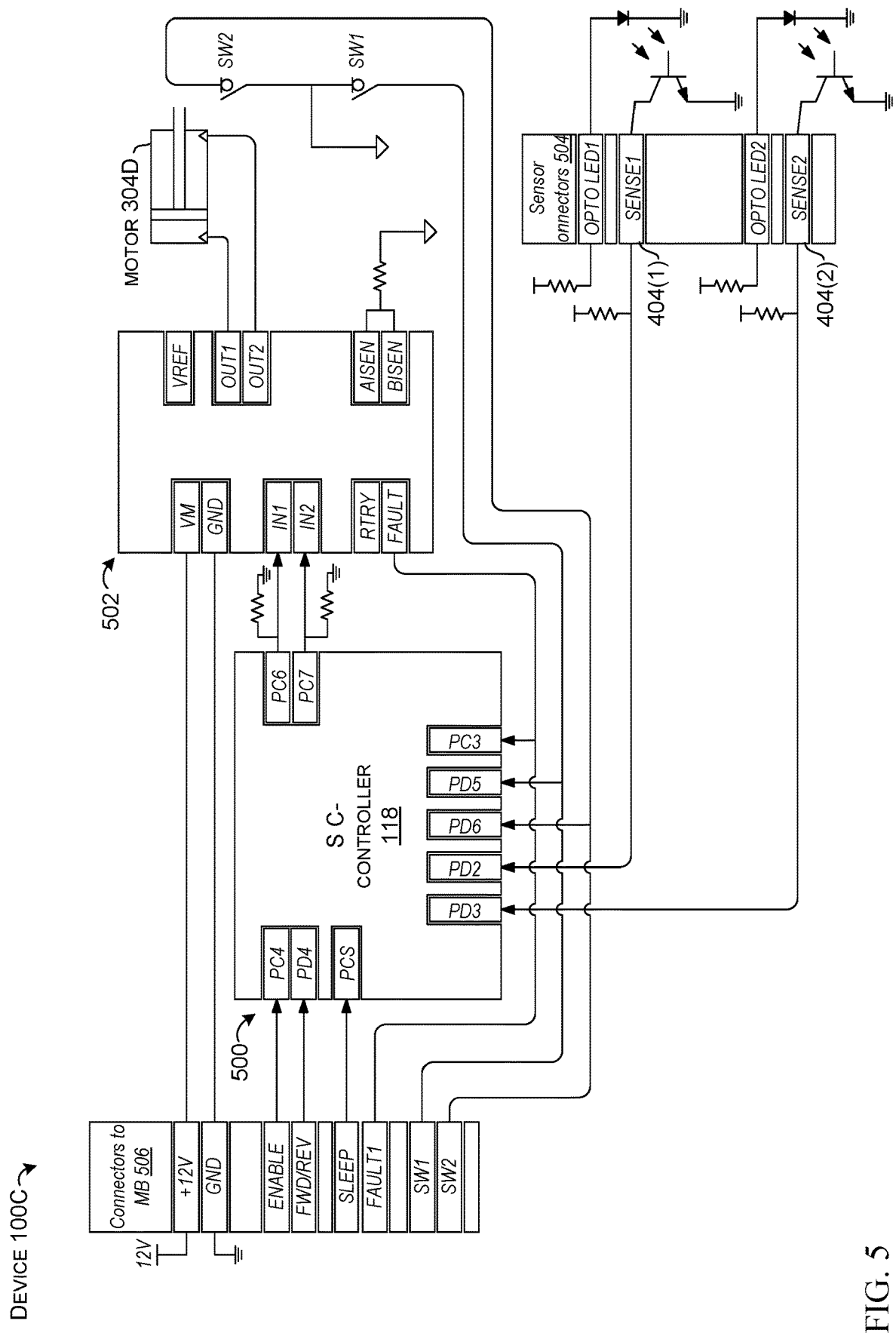
FIG. 5 is a schematic diagram of device components and connections in accordance with one example of the present concepts.

FIG. 5 shows an example schematic implementation of device 100C. (The suffix 'C' is used with device 100C to convey that components of this device may be the same and/or different from devices of FIGS. 1A-1B, 2A-2D, and 3. To avoid clutter on the drawing page the 'C' suffix is not carried through to individual components). Device 100C can include smart clutch-controller 118 with associated connectors 500, motor connectors 502, motor 304, sensor connectors 504, optical sensors 404, and motherboard connectors 506.

The smart clutch-controller 118 can include multiple connectors 500 including general purpose input/output ports that are manifest as PC6, PC7, PC3, PD5, PD6, PD2, PD3, PCS, PD4, and PC4.

The motor connectors 502 can include reference voltage (VREF), output 1 (OUT1), output 2 (OUT2), first current sense pin for controller (AISEN), second current sense pin for controller (BISEN), (FAULT), retry (RTRY), input 1 (IN1), input 2 (IN2), ground (GND), and motor voltage (VM).

The optical sensor connectors 504 can relate to optical sensors 404(1) and 404(2) and can include a first optical LED (OPTO LED1), sensors 1 (SENSE1), a second optical LED (OPTO LED2), and sensors 2 (SENSE2).

Motherboard connectors 506 can include a 12 volt connection (+12V), a ground (GND), (ENABLE) (e.g., connection to host processor that can issue commands to enable and disable the clutch), forward reverse (FWD/REV), (SLEEP), (FAULT1), a first switch (SW1), and a second switch (SW2).

FIG. 5 provides an example of how various device components can be electrically connected. Other implementations can employ other schemes.

Figure 6:
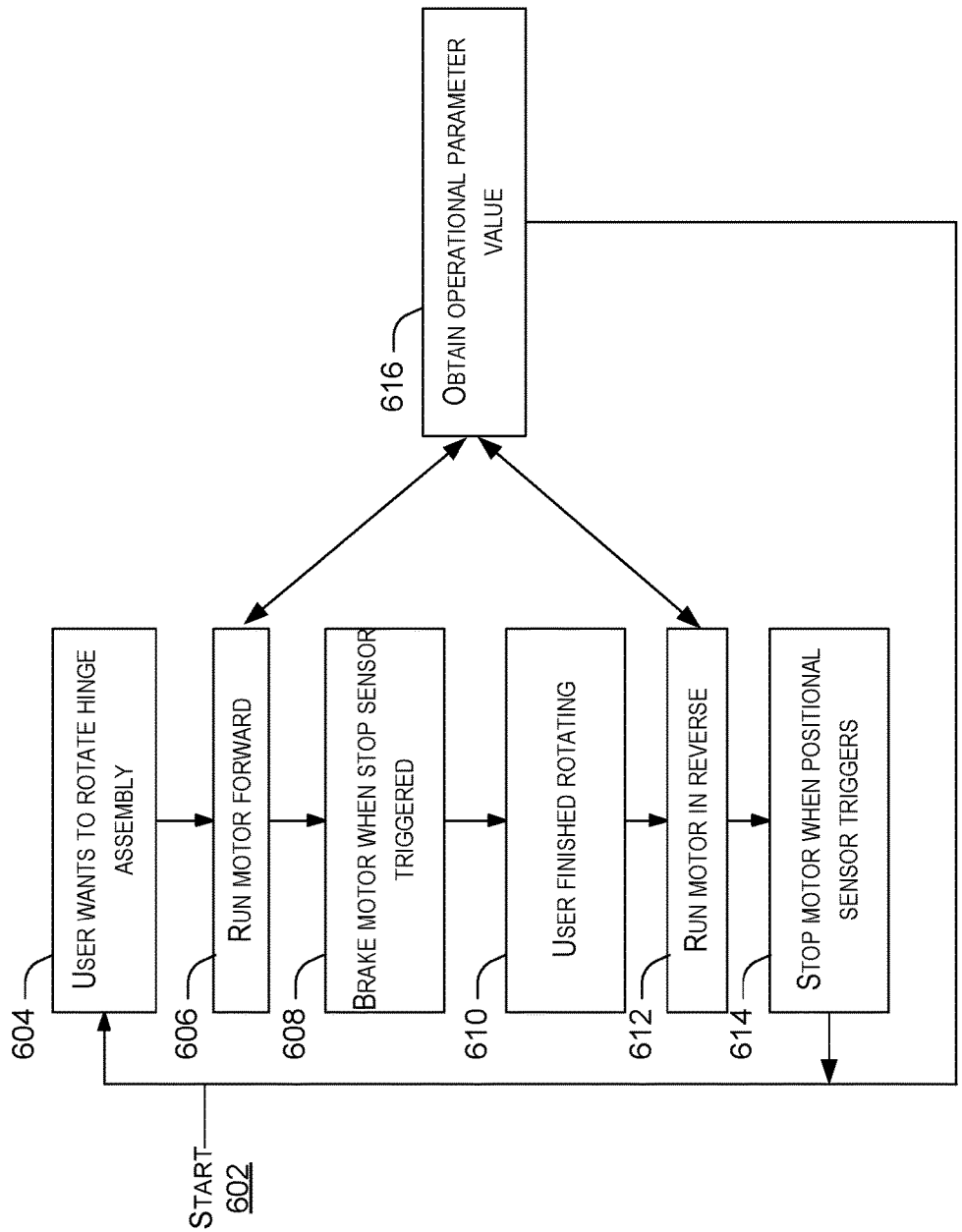
FIGS. 6 and 7 are flowcharts of example methods in accordance with the present concepts.

FIG. 6 shows an example method 600 that can employ the present smart clutch control concepts. For purposes of discussion, the explanation starts at block 602. In this case, block 602 can include various initialization aspects, such as applying power (e.g., 12V power), booting up the controller, configuring general purpose input output (GPIO), external interrupts, timer, and turning on interrupts. The motor can be run to the 'home' position (e.g., locked position such as FIG. 4A Time Three) with clutch portions engaged to lock the clutch. When the stop sensor triggers (e.g., SENSE2=0), then the method can leave the clutch engaged or locked. Optical sensors 404 of FIG. 4A can provide an example of the stop sensor.

At block 604, the method can receive signals from user control sensors indicating the user wants to rotate the hinge assembly. Toward this end, some implementations can monitor for the user to engage user control sensors (120, FIG. 2A). The method can interpret user engagement as a command to unlock the hinge assembly and allow rotation. In one implementation, this can be expressed by enabling an active line from the user control sensors 120 so EN=0, where 'EN' is a flag that indicates whether to enable the clutch or not. The EN flag can be set based upon the user control sensor detection result. For example, EN=0 means active (e.g., user control gesture sensed) and EN=1 means inactive (e.g., user control gesture not currently sensed). Thus, sensor activation can be utilized as an indication that the user wants to rotate the hinge. Responsively, at block 606, the method can run the motor forward to disengage the clutch elements (306 and 308, FIG. 4A) from locked position (Time Three, FIG. 4A) where clutch portions are engaged to a disengaged position that allows hinge rotation (Time One, FIG. 4A). At block 608, the method can sense whether the stop sensor, such as sensor(s) 404 of FIG. 4A, is triggered (e.g., SENSE1=0) and if so brake the motor.

At block 610, the method can detect when the user is finished rotating the hinge assembly (e.g., user lets go of the user control sensor—enable line inactive—(EN=1)). At block 612, the method can run the motor in reverse (e.g., cause the clutch to transition from the disengaged position to the engaged or locked position, such as Time Three of FIG. 4A). At block 614, the method can stop the motor when the positional sensor (such as optical sensor 404(2) of FIG. 4A) triggers (e.g., sensor triggered brake motor (e.g. SENSE2=0) and the hinge can be locked (e.g., non-rotatable)). At this point the method can return to block 604.

As indicated at block 616, the method can also obtain one or more operational parameter values from the device. For instance, the method can detect hardware interrupts at various points. For example, when the method first drives the motor at block 606, the motor can be driven until the stop sensor is triggered. Operational parameters, such as the drive time and/or the current, among others, can be obtained and in some implementations recorded. The next time the motor is driven at block 606 and/or block 612, an action can be taken based upon the operational parameters. For instance, a sharp current drop can be used as an indicator to reduce pulse width modulation (PWM) duty percentage during the next cycle (e.g., change a profile of the PWM). Operational parameters, such as drive time and/or current can be recorded again.

This process of sensing operational parameters during motor operation can be repeated iteratively to achieve desired operating parameters, such as $Time_n$<75 milliseconds (ms) and $Current_n$>−50 mA for controlling the clutch. Other implementations with other components, such as other motors, can define or specify different operating parameter values. Upon completion of block 614 the method can once again return to block 604. However, from this cycle forward, when the method reaches blocks 612 and/or 614, the motor can be controlled in a smart manner that reflects the feedback represented by the operational parameter value. For instance, if the operational parameter value is a sudden current drop as the clutch elements engage, then in the next cycle the motor can be run for a shorter time and/or at a different PWM. The resultant current drop can be obtained and used for controlling the next cycle in an iterative manner until design specifications are satisfied. For instance, the design specification may define that the slope of the current should be between −1 and −2 during clutch element engagement. The smart clutch control iterative cycling with feedback from the operational parameters can increase a likelihood that the clutch is operated in compliance with the design specification and hence in a manner that reduces wear and tear on the device and is pleasing to the user.

Stated another way, some implementations can monitor the position of the clutch and operational parameters such as the current, then automatically fine tune clutch actuation by adjusting operational parameters for driving the motor.

Figure 7:
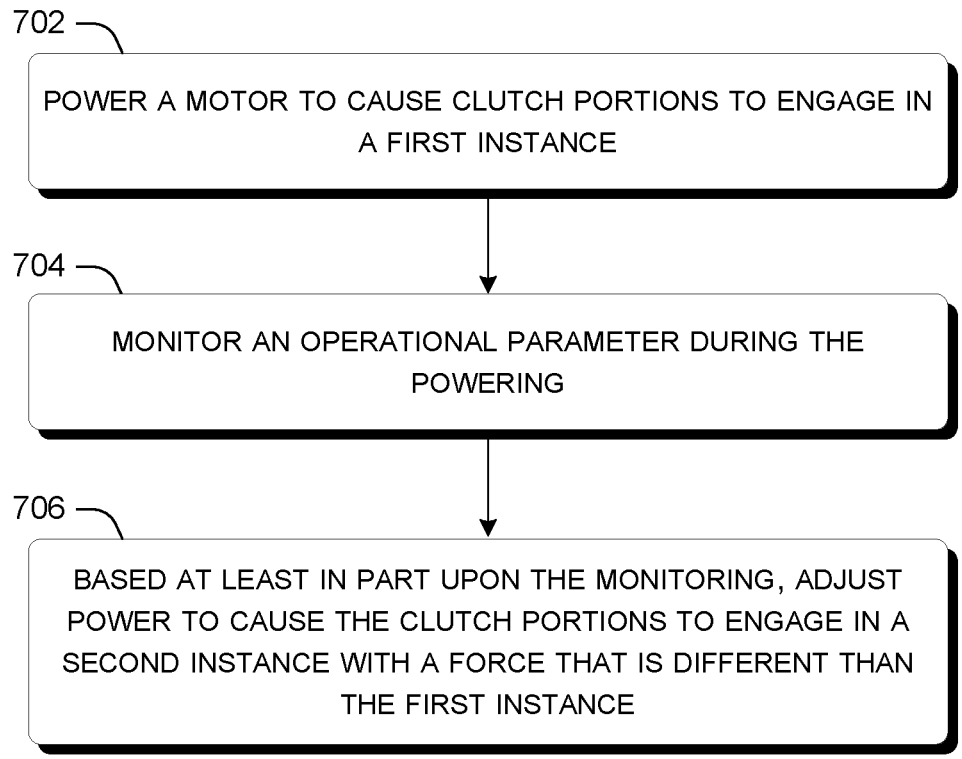

FIG. 7 provides another example method 700. In this case, at block 702, the method can power a motor to cause clutch portions to engage in a first instance. At block 704, the method can monitor an operational parameter during the powering. Examples of operational parameters are described above and can include time, power, power profile, current, current profile, rate of change of current, rotational speed (e.g., rate or rotation) and/or pulse width modulation, among others. In some implementations, the monitored operational parameter(s) can be stored. In some of these implementations only the most recent monitored operational parameter values (e.g., those from the current cycle) are stored. In other implementations, monitored operational parameter values from several cycles can be saved.

At block 706, the method can adjust power to cause the clutch portions to engage in a second instance with a force that is different than the first instance. The adjusting can be based at least in part upon the monitoring. For instance, if the monitoring detects a rapid drop in current at the end of the powering, this drop can be treated as an indicator of the clutch portions engaging at a relatively high force (e.g., hard stop). The adjusting can entail changing the time that the motor is driven. Alternatively, the adjusting can entail adjusting the pulse width modulation so that the motor is driven a lesser percentage of time during each cycle (e.g., modulation). This can decrease the rate at which the motor turns and thus the rate at which the motor moves the clutch portion. The pulse width modulation adjustment can be through the entire duration that the motor is driven or a subset (e.g., the motor is driven according to a first PWM scheme for a period of time and then switched to a second PWM scheme for a remainder of the cycle). For instance, the motor may be driven with a first PWM scheme for a first duration or until a sensor indicates the clutch portion is at a specific point in its movement, and then the motor could be driven at a different PWM scheme. The adjusting can be based upon the stored operational parameter values from the preceding cycle or from multiple preceding cycles. Where multiple cycles are utilized, the stored operational parameter values from each of the previous cycles can be given the same weight or they can be weighted differently. For instance, some implementations can store and consider operational parameter values from multiple cycles, but weight more recent cycles higher than more distant cycles (e.g., the operational parameter values from the last cycle is weighted higher than the operational parameter values from the cycle before that).

Note that other implementations may not directly relate to clutch forces. For example, an alternative implementation can define a desired current slope or range of current slopes as the clutch returns to the locked position. The example can sample the current when the clutch is driven, compare the sampled current to the defined current slope, and adjust how the motor is driven to attempt to achieve the desired defined clutch slope. This smart clutch control adjustment that is based at least in part upon how the clutch is actually operating can be repeated in subsequent cycles to ensure clutch operation consistent with the defined current slope. The skilled artisan will recognize from the discussion above that parameters other than current slope can be used as feedback to achieve smart clutch control.

The described methods can be performed by the systems and/or devices described above, and/or by other devices and/or systems. The order in which the methods are described is not intended to be construed as a limitation, and any number of the described acts can be combined in any order to implement the method, or an alternate method. Furthermore, the methods can be implemented in any suitable hardware, software, firmware, or combination thereof, such that a device can implement the method. In one case, the method is stored on computer-readable storage media as a set of instructions such that execution by a processor of a computing device causes the computing device to perform the method.

Various device examples are described above. Additional examples are described below. One example includes a device comprising: a base assembly, a display assembly including a display, and a hinge assembly rotatably coupling the base assembly and the display assembly. The hinge assembly comprises a clutch that is configured to be transitioned between a disengaged position that allows the hinge assembly to rotate and an engaged position that locks the hinge assembly. The hinge assembly further comprises a DC motor that is configured to transition the hinge assembly between the disengaged position and the engaged position, and further comprises a smart clutch-controller that is configured to supply power to the DC motor to cause the DC motor to transition the clutch between the engaged and disengaged positions. The smart clutch-controller is further configured to monitor an operational parameter of the power when the clutch reaches the engaged position and to adjust subsequent power supplied to the DC motor to transition the clutch based upon the monitored operational parameter.

Another example can include any of the above and/or below examples where the hinge assembly comprises a single hinge axis or multiple hinge axes.

Another example can include any of the above and/or below examples where the clutch comprises a single clutch.

Another example can include any of the above and/or below examples where the clutch comprises multiple clutches.

Another example can include any of the above and/or below examples where the operational parameter comprises a single parameter.

Another example can include any of the above and/or below examples where the operational parameter comprises multiple parameters.

Another example can include any of the above and/or below examples where an individual operational parameter is user defined.

Another example can include any of the above and/or below examples where an individual user defined operational parameter relates to hinge smoothness.

Another example can include any of the above and/or below examples where the operational parameter comprises a power profile, a current profile, or a pulse width modulation profile.

Another example can include any of the above and/or below examples where the operational parameter comprises a slope of current over time.

Another example can include any of the above and/or below examples where the clutch comprises opposing geared elements.

Another example can include any of the above and/or below examples where the operational parameter is indicative of interaction of the geared elements.

Another example can include any of the above and/or below examples where the clutch comprises opposing elements.

Another example can include any of the above and/or below examples where the operational parameter is indicative of physical interaction of the elements.

Another example can include any of the above and/or below examples where the controller is configured to subsequently adjust the subsequent power by adjusting a duration that the subsequent power is supplied.

Another example can include any of the above and/or below examples where the controller is configured to adjust the subsequent power by adjusting a pulse width modulation of the subsequent power.

Another example can include any of the above and/or below examples where the axis is coextensive with a shaft of the hinge.

Another example can include a device comprising first and second portions and a hinge assembly rotatably coupling the first and second portions around an axis. The device further comprises a clutch positioned relative to the axis and comprising opposing elements, a motor configured to cause the opposing elements to engage one another to prevent rotation around the axis and to disengage the opposing elements to allow rotation around the axis, and further comprising a controller. The controller is configured to drive the motor a first time to cause the opposing elements to engage one another a first time, sense an operational parameter as the opposing elements engage one another the first time, and adjust driving the motor a second time based at least in part upon the sensed operational parameter to cause the opposing elements to engage one another a second time.

Another example can include any of the above and/or below examples where the controller is configured to sense the operational parameter by monitoring power to drive the motor.

Another example can include any of the above and/or below examples where the controller is configured to sense the operational parameter without any additional components beyond conductors employed to drive the motor.

Another example can include any of the above and/or below examples where the controller is configured to adjust driving the motor the second time to decrease a force that the opposing elements engage one another compared to a force that the opposing elements engaged one another driving the motor the first time.

Another example can include any of the above and/or below examples where the controller is configured to store the operational parameter from the first time and the second time and to utilize the stored operational parameters to adjust driving the motor a third time.

Another example can include any of the above and/or below examples where the controller is configured to weight the stored operational parameter from the second time same as the stored operational parameter from the first time.

Another example can include any of the above and/or below examples where the controller is configured to weight the stored operational parameter from the second time higher than the stored operational parameter from the first time.

Another example can include any of the above and/or below examples where the controller is configured to iteratively repeat the storing and adjusting when driving the motor subsequent times.

Another example can include a method comprising: first powering a motor to cause clutch portions to engage in a first instance, monitoring an operational parameter during the powering, and based at least in part upon the monitoring, adjusting a second powering to cause the clutch portions to engage in a second instance with a force that is different than the first instance.

Another example can include any of the above and/or below examples where the monitored operational parameter comprises current flow over time.

Another example can include any of the above and/or below examples where a change in the monitored current flow is indicative of the clutch portions physically engaging one another.

Another example can include any of the above and/or below examples where the adjusting decreases a force at which the clutch portions physically contact one another in the second powering compared to the first powering.

Another example can include any of the above and/or below examples where the adjusting comprises adjusting a current and/or a pulse width modulation of the second powering.

Another example can include any of the above and/or below examples where the first powering, monitoring, adjusting and second powering are repeated iteratively.

Another example can include any of the above and/or below examples where more recent monitored current flows are weighted higher than less recent monitored current flows.

Another example can include any of the above and/or below examples where the monitoring comprises monitoring the first powering.

CONCLUSION

Although techniques, methods, devices, systems, etc., pertaining to smart clutch control are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A device, comprising:
   a base assembly;
   a display assembly including a display; and
   a hinge assembly rotatably coupling the base assembly and the display assembly, the hinge assembly comprising:
   a clutch that repeatedly transitions between a disengaged position and an engaged position through a plurality of cycles, the clutch in the disengaged position allowing the hinge assembly to rotate, the clutch in the engaged position locking the hinge assembly from rotating,
   a motor that transitions the clutch between the disengaged position and the engaged position, and
   a smart clutch-controller that:
   in a first cycle, controls first power supplied to the motor to cause the motor to transition the clutch from the disengaged position to the engaged position, and monitors one or more operational parameters of the first power when the clutch transitions to the engaged position with first force; and
   in a second cycle, adjusts second power based at least in part upon the one or more operational parameters monitored in the first cycle, and controls the second power supplied to the motor to transition the clutch from the disengaged position to the engaged position with second force that is less than the first force.

2. The device of claim 1, wherein the hinge assembly comprises a single hinge axis or multiple hinge axes.

3. The device of claim 1, wherein the clutch comprises a single clutch.

4. The device of claim 1, wherein the clutch comprises multiple clutches.

5. The device of claim 1, wherein the one or more operational parameters of the first power comprises a single operational parameter relating to the first power supplied to the motor.

6. The device of claim 1, wherein the one or more operational parameters of the first power comprises multiple operational parameters relating to the first power supplied to the motor.

7. The device of claim 6, wherein the one or more operational parameters include a user defined operational parameter.

8. The device of claim 7, wherein the user defined operational parameter relates to hinge smoothness.

9. The device of claim 1, wherein the one or more operational parameters of the first power comprise a power profile, a current profile, or a pulse width modulation profile.

10. The device of claim 1, wherein the one or more operational parameters of the first power comprise a slope of current over time.

11. The device of claim 1, wherein the clutch comprises opposing geared elements.

12. The device of claim 11, wherein the one or more operational parameters of the first power are indicative of interaction of the geared elements.

13. The device of claim 1, wherein the clutch comprises opposing elements.

14. The device of claim 13, wherein the one or more operational parameters of the first power are indicative of physical interaction of the elements.

15. The device of claim 1, wherein the smart clutch-controller adjusts the second power by adjusting a duration that the second power is supplied.

16. The device of claim 1, wherein the smart clutch-controller adjusts the second power by adjusting a pulse width modulation of the second power.

17. A device, comprising:
    first and second portions;
    a hinge assembly rotatably coupling the first and second portions around an axis;
    a clutch positioned relative to the axis and comprising opposing elements;
    a motor that causes the opposing elements to engage and disengage repeatedly through a plurality of cycles, the opposing elements engaged with one another preventing rotation around the axis, the opposing elements disengaged allowing rotation around the axis; and
    a controller that:
        in a first cycle, drives the motor to cause the opposing elements to engage one another and senses a first operational parameter as the opposing elements engage one another with first force, and
        in a second cycle, adjusts driving the motor based at least in part upon the first operational parameter to cause the opposing elements to engage one another with second force.

18. The device of claim 17, wherein the controller senses the first operational parameter by monitoring power to drive the motor.

19. The device of claim 18, wherein the controller senses the first operational parameter without any additional components beyond conductors employed to drive the motor.

20. The device of claim 17, wherein the controller adjusts driving the motor in the second cycle to decrease the second force that the opposing elements engage one another with compared to the first force that the opposing elements engage one another with in the first cycle.

21. The device of claim 17, wherein the controller stores the first operational parameter from the first cycle and a second operational parameter from the second cycle and utilizes the first and second operational parameters to adjust driving the motor in a third cycle.

22. The device of claim 21, wherein the controller weights the second operational parameter from the second cycle the same as the first operational parameter from the first cycle.

23. The device of claim 21, wherein the controller weights the second operational parameter from the second cycle higher than the first operational parameter from the first cycle.

24. The device of claim 23, wherein the controller iteratively repeats the storing and adjusting when driving the motor in subsequent cycles.

25. A method, comprising:
    powering a motor to cause clutch portions to engage with first force in a first cycle;
    monitoring an operational parameter of the motor during the powering; and
    based at least in part upon the monitoring, adjusting power in a second cycle to cause the clutch portions to engage with a second force that is different than the first force.

26. The method of claim 25, wherein the monitored operational parameter comprises current flow over time.

27. The method of claim 26, wherein a change in the monitored current flow is indicative of the clutch portions physically engaging one another.

28. The method of claim 27, wherein the adjusting decreases the second force at which the clutch portions physically contact one another in the second cycle compared to the first force in the first cycle.

29. The method of claim 25, wherein the adjusting comprises adjusting a current and/or a pulse width modulation of the power supplied in the second cycle.

30. The method of claim 25, wherein the powering, monitoring, and adjusting are repeated iteratively.

31. The method of claim 30, wherein more recent monitored current flows are weighted higher than less recent monitored current flows.

32. The method of claim 25, wherein the monitoring comprises monitoring the powering of the clutch in the first cycle.

* * * * *